(12) United States Patent
Alvarez et al.

(10) Patent No.: US 8,253,856 B1
(45) Date of Patent: Aug. 28, 2012

(54) METHOD AND/OR ARCHITECTURE FOR INTERLACED VIDEO RESAMPLING AND COLOR FORMAT CONVERSION USING COMBINED VERTICAL-TEMPORAL RESOLUTION EXTENSIONS

(75) Inventors: José R. Alvarez, Sunnyvale, CA (US); Simon Butler, San Rafael, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1511 days.

(21) Appl. No.: 11/608,968

(22) Filed: Dec. 11, 2006

(51) Int. Cl.
*H04N 5/04* (2006.01)

(52) U.S. Cl. ........ 348/550; 348/607; 348/453; 348/582; 348/447; 348/441; 348/581; 348/458; 382/298; 382/299; 382/300; 345/660; 345/581; 345/667

(58) Field of Classification Search .................. 348/581, 348/582, 458, 446, 448, 550, 211.5, FOR. 189, 348/E5.043, 607, 447, 441, 453, 625, 628, 348/629, 663; 345/660, 667; 382/298, 299, 382/300
See application file for complete search history.

(56) References Cited

U.S. PATENT DOCUMENTS

| | | | | |
|---|---|---|---|---|
| 5,530,484 A | * | 6/1996 | Bhatt et al. | 348/556 |
| 6,108,047 A | * | 8/2000 | Chen | 348/581 |
| 6,144,412 A | * | 11/2000 | Hirano et al. | 348/441 |
| 7,446,815 B2 | * | 11/2008 | Kasahara et al. | 348/448 |
| 2004/0006772 A1 | * | 1/2004 | Ansari et al. | 725/120 |
| 2004/0075764 A1 | * | 4/2004 | Law et al. | 348/448 |

* cited by examiner

*Primary Examiner* — Jefferey Harold
*Assistant Examiner* — Omer Khalid
(74) *Attorney, Agent, or Firm* — North Weber & Baugh LLP (57) ABSTRACT

An apparatus including a first circuit and a second circuit. The first circuit may be configured to generate a first control signal, a second control signal and a third control signal in response to a first interlaced video signal. The second circuit may be configured to generate a second interlaced video signal in response to the first interlaced video signal, the first control signal, the second control signal and the third control signal. The second circuit may be further configured to vertically scale the first interlaced video signal in an extended vertical domain.

20 Claims, 10 Drawing Sheets

METHOD AND/OR ARCHITECTURE FOR INTERLACED VIDEO RESAMPLING AND COLOR FORMAT CONVERSION USING COMBINED VERTICAL-TEMPORAL RESOLUTION EXTENSIONS

FIELD OF THE INVENTION

The present invention relates to video processing generally and, more particularly, to a method and/or architecture for interlaced video resampling and color format conversion using combined vertical-temporal resolution extensions.

BACKGROUND OF THE INVENTION

Spatial scaling, temporal resampling and color format conversion are operations performed at various points of the production and consumption of video. In conventional systems spatial scaling, temporal resampling and color format conversion are each carried out by separate equipment. Resampling operations are common in the industry to provide format conversions including all Digital Television systems such as 1080i, 480i, 576i and other derivatives. Furthermore, while many capture and display systems use the YUV 4:2:2 format, digital compression Codecs (encoders/decoders) associated with such systems commonly work in the YUV 4:2:0 domain, creating a need for high quality conversion.

When scaling digital video, existing spatial scalers resize progressive video as separate frames and interlaced video as separate fields. Each picture is independently scaled in the spatial domain in its own sampling time. For example, 720p pictures are scaled from 1280×720 pictures at 60 Frames/sec; while 1080i pictures are scaled from 1920×540 pictures at 60 fields/sec. Each spatial direction is scaled independently, usually in the horizontal direction first in order to reduce the size of line buffers used for the vertical direction.

There usually are no problems in horizontal scaling, as long as adequately long filters are used. However, for interlaced video there can be quality problems in the vertical domain, even when using sophisticated polyphase filters. The reason for quality problems in the vertical domain is the lack of quality when scaling separate fields due to an implied decimation in the vertical domain that is not accompanied by an antialiasing filter.

Figure 1:
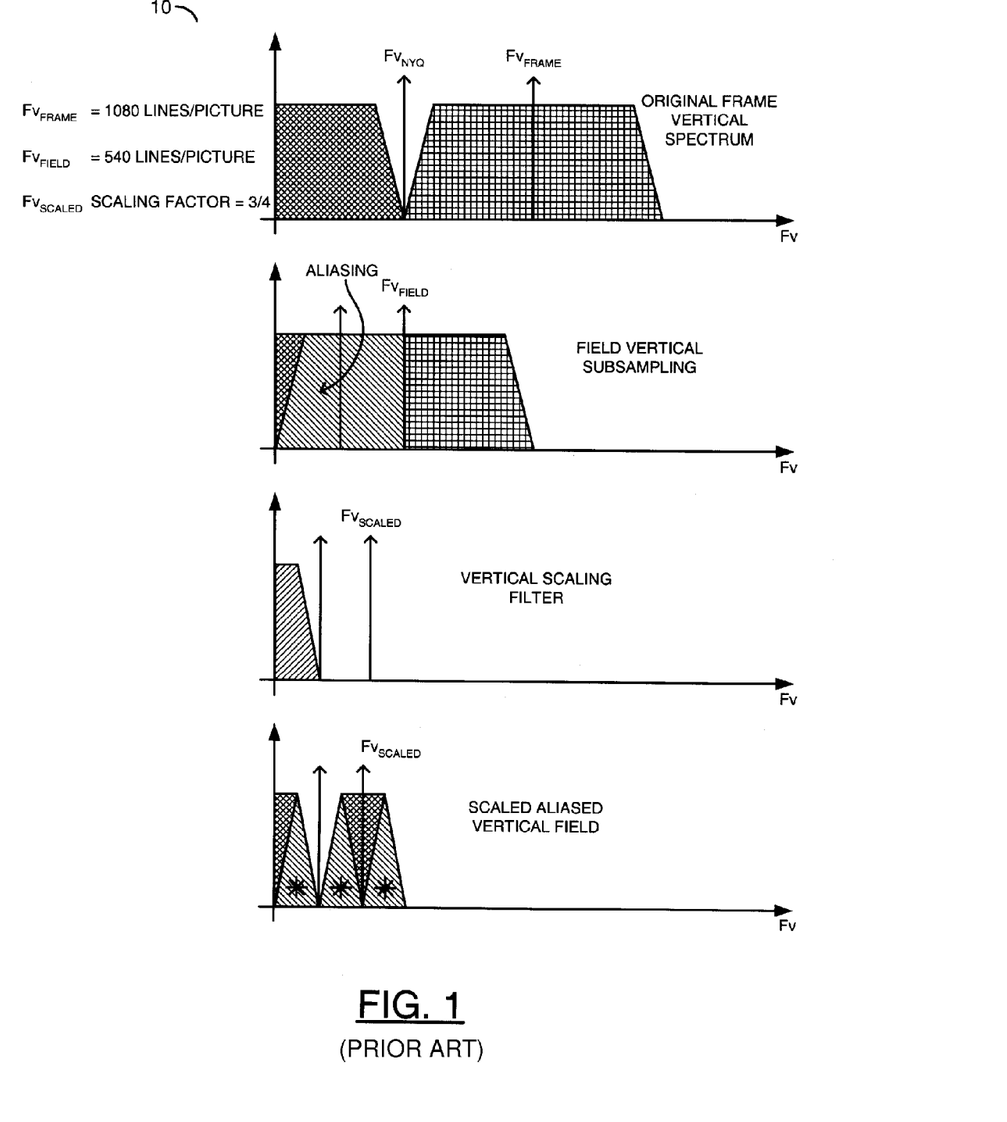
FIG. 1 is a diagram illustrating a conventional vertical field scaling operation.

Referring to FIG. 1, a diagram 10 is shown illustrating potential aliasing components resulting from vertical spatial scaling of interlaced pictures. Interlaced cameras and video production equipment do not perform antialiasing because any aliasing components are temporary since they are cancelled out when the interlaced material is displayed on an interlaced display device. While vertical spatial scaling of independent pictures works well for progressive video, for interlaced pictures the potential aliasing components (marked by asterisks in FIG. 1) of each field are preserved after resampling and cannot be cancelled out at the display end. Performing antialiasing on the decimated fields yields no new information and reduces perceived resolution that cannot be regained after top/bottom fields are displayed as coherent frames at the display.

Conventional solutions to the problem of high-quality vertical scaling of interlaced content solve the problem by circumventing the problem (i.e., by performing an interlace-to-progressive conversion and operating in the progressive domain). However, performing an interlace-to-progressive conversion and operating in the progressive domain produces twice the amount of data and does not adequately reflect the intended vertical-temporal content of the original video input, especially when the resampled signal is displayed on an interlaced monitor. Furthermore, because interlace-to-progressive conversion is not a perfect operation, artifacts can be created that can be objectionable.

SUMMARY OF THE INVENTION

The present invention concerns an apparatus including a first circuit and a second circuit. The first circuit may be configured to generate a first control signal, a second control signal and a third control signal in response to a first interlaced video signal. The second circuit may be configured to generate a second interlaced video signal in response to the first interlaced video signal, the first control signal, the second control signal and the third control signal. The second circuit may be further configured to vertically scale the first interlaced video signal in an extended vertical domain.

The objects, features and advantages of the present invention include providing a method and/or architecture for interlaced video resampling and color format conversion using combined vertical-temporal resolution extensions that may (i) enable vertical scaling in an intermediate progressive domain, (ii) extend an original interlaced spectrum, (iii) reduce aliasing artifacts, (iv) provide a motion and spatial adaptive interpolation process that may be used for vertical-temporal scaling in luma and chroma signals, (v) provide a motion and spatial adaptive interpolation process that may be used for color space conversion in the chroma signal, (vi) improve quality for interlaced video coding, (vii) extend the vertical-temporal domain, (viii) integrate an intermediate progressive-to-interlaced conversion step in a single module with a scaler and a chroma format converter, (ix) save resources, (x) provide a significant improvement in coding quality at lower bitrates and/or (xi) operate as a traditional deinterlacer and/or scaler for progressive coding and display.

BRIEF DESCRIPTION OF THE DRAWINGS

These and other objects, features and advantages of the present invention will be apparent from the following detailed description and the appended claims and drawings in which:

FIG. 8(a-d) are block diagrams illustrating a vertical multiphase scaler in accordance with the present invention.

DETAILED DESCRIPTION OF THE PREFERRED EMBODIMENTS

Figure 2:
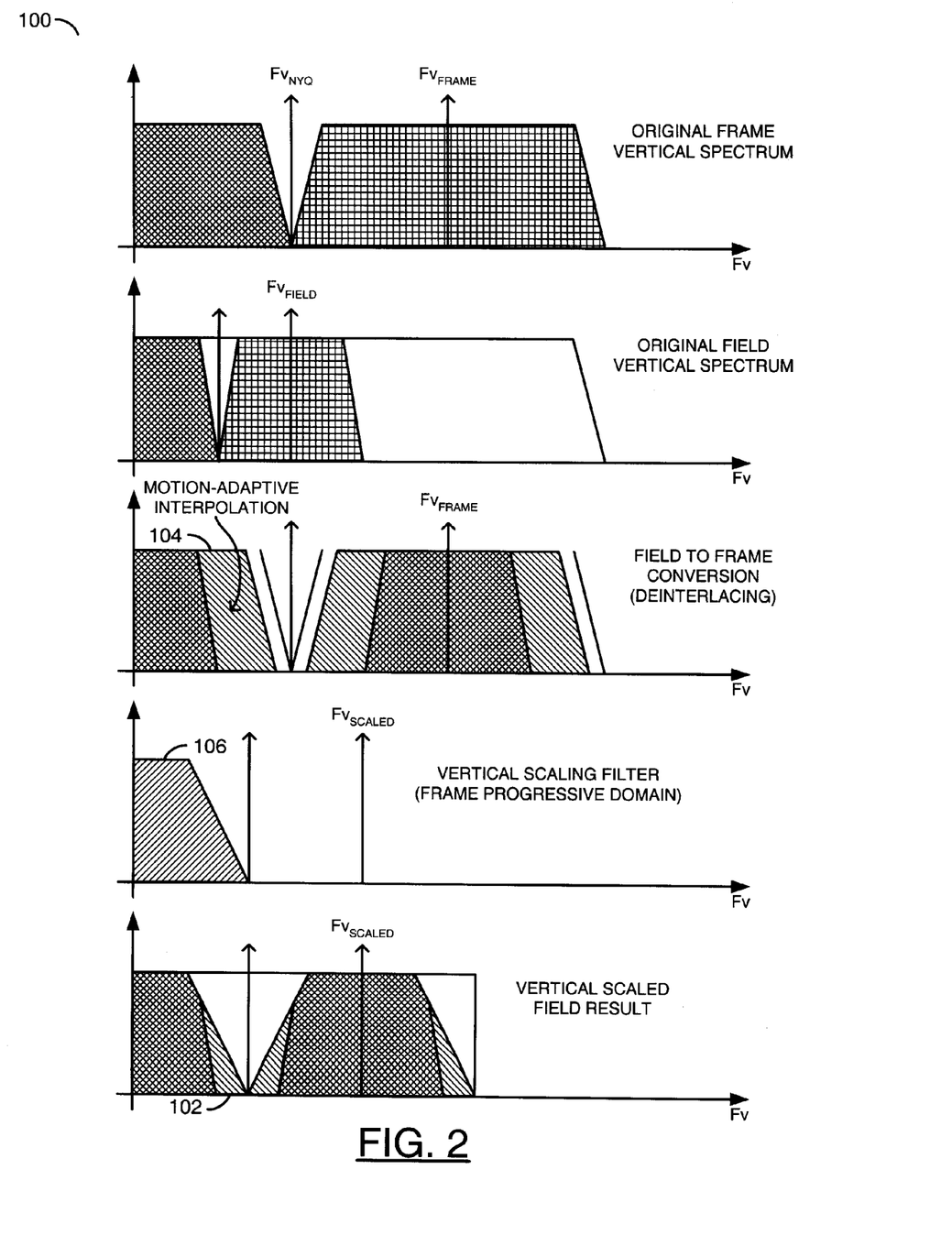
FIG. 2 is a diagram illustrating vertical scaling in an extended vertical domain in accordance with the present invention.

Referring to FIG. 2, a spectrum diagram 100 is shown illustrating vertical scaling in an extended vertical domain in accordance with the present invention. The present invention generally provides an extension 102 of the vertical resolution of each field. The extension 102 is generally based on the nature of vertical detail and amount of motion present 104 among several adjacent present and past fields. The process in accordance with the present invention generally enhances the perceived resolution by internally—and briefly—doubling the number of vertical samples such that vertical resampling 106 may be effectively performed in the extended frequency domain with reduced aliasing.

Figure 3:
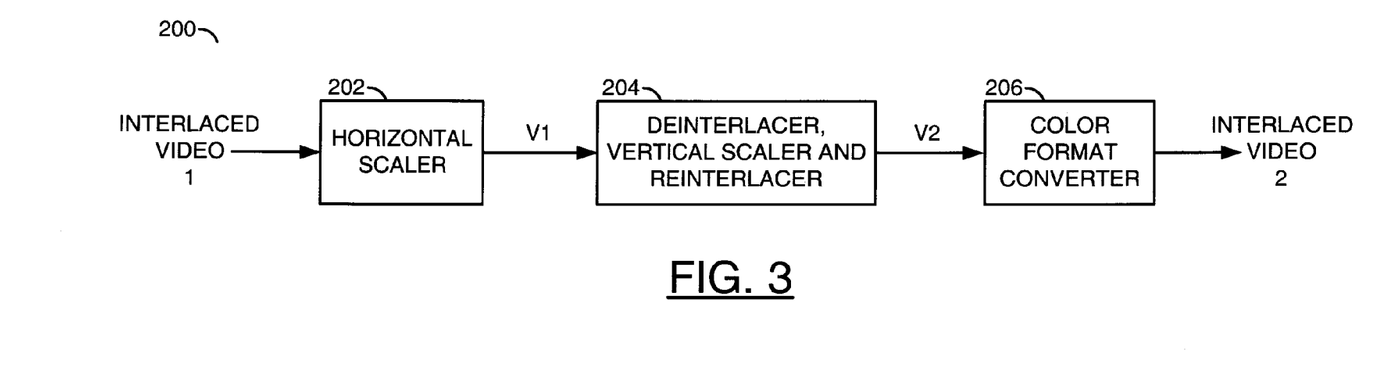
FIG. 3 is a block diagram illustrating interlaced domain processing in accordance with the present invention.

Referring to FIG. 3, a block diagram of a system 200 is shown illustrating an example of interlaced domain processing in accordance with the present invention. In contrast to conventional techniques, the present invention provides an interlaced-to-progressive step embedded in the resampling process. The final output video is presented in the interlaced domain rather than the progressive domain. The quality specifications for the embedded deinterlacer may be more relaxed because imperfections (e.g., artifacts) caused by the simplicity of the embedded deinterlacer may be masked by combined scaling (e.g., resampling) and reinterlacing (e.g., decimation) steps. A color format conversion (CFC) may also be integrated within the system 200. In general, color format conversion is, in principle, another scaling operation performed on the chrominance (or chroma) components with some specific phase and sampling specifications depending on top/bottom field processing.

The system 200 may comprise a block 202, a block 204 and a block 206. The block 202 may be implemented as a horizontal scaler. The block 204 may be implemented as a deinterlacer, vertical scaler and reinterlacer. The block 206 may be implemented as a color format converter. The blocks 202-206 may be implemented in hardware, software or a combination of hardware and software.

A signal (e.g., INTERLACED_VIDEO_1) may be presented to an input of the block 202. An output of the block 202 may present a signal (e.g., V1) to an input of the block 204. An output of the block 204 may present a signal (e.g., V2) to an input of the block 206. An output of the block 206 may be present a signal (e.g., INTERLACED_VIDEO_2). The signal INTERLACE_VIDEO_1 may be implemented as an interlaced video input signal. The signals V1 and V2 may be implemented as interlaced video signals. The signal INTERLACED_VIDEO_2 may be implemented as an interlaced video output signal. The signal INTERLACED_VIDEO_2 may have a different scale and/or color format from the signal INTERLACED_VIDEO_1.

Figure 4:
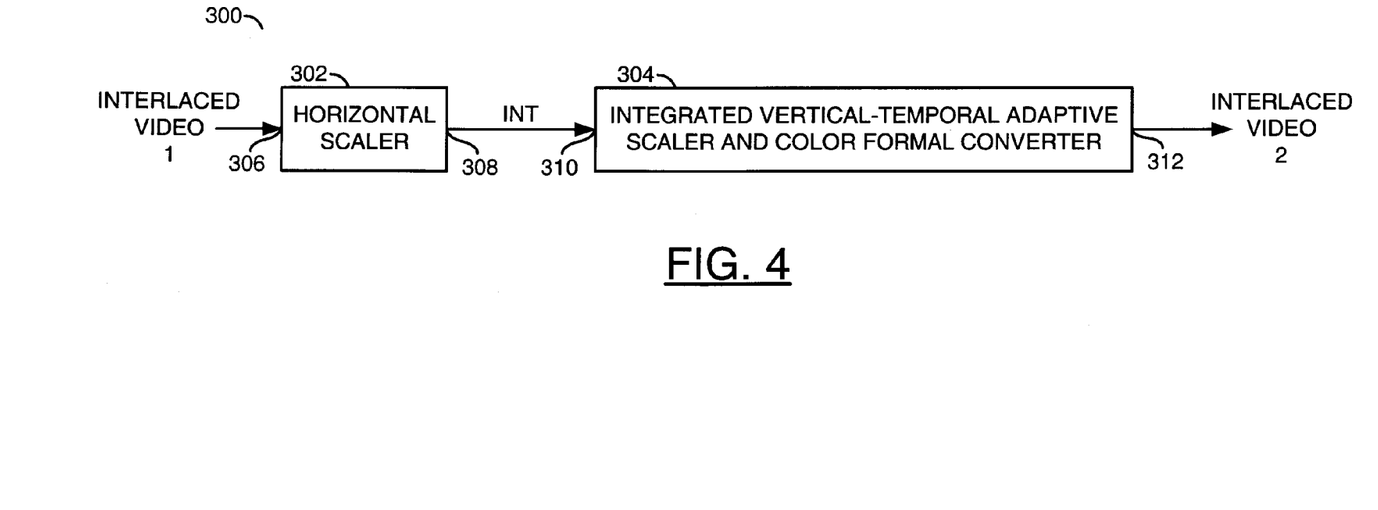
FIG. 4 is a block diagram illustrating an integrated vertical-temporal resampler and color format converter in accordance with the present invention.

Referring to FIG. 4, a block diagram of a system 300 is shown illustrating an integrated vertical temporal resampler and color format converter in accordance with the present invention. In one example, the system 300 may comprise a block 302 and a block 304. The block 302 may be implemented as a horizontal scaler. The block 304 may be implemented as an integrated vertical temporal adaptive scaler and color format converter. In one example, the functions of the deinterlacer 204, vertical scaler/reinterlacer 206 and color format converter (CFC) 208 may be integrated into a single structure as the integrated vertical temporal resampler and color format converter 304. The integrated vertical temporal resampler and color format converter 304 may share common processing operations for performing vertical-temporal interpolation, vertical resampling (e.g., scaling and decimation) and color format conversion.

The block 302 may have an input 306 that may receive an input signal (e.g., the signal INTERLACED_VIDEO_1) and an output 308 that may present an intermediate signal (e.g., INT) to an input 310 of the block 304. The block 304 may have an output 312 that may present an output signal (e.g., the signal INTERLACED_VIDEO_2). The signal INTERLACED_VIDEO_1 may be implemented as a first (or input) interlaced video signal. The signal INTERLACED_VIDEO_1 may have a first scale and a first color format. The signal INTERLACED_VIDEO_2 may be implemented as a second (or output) interlaced video signal. The signal INTERLACED_VIDEO_2 may have a second scale and/or a second color format. The second scale and/or the second color format may be different from the first scale and/or the first color format.

Figure 5:
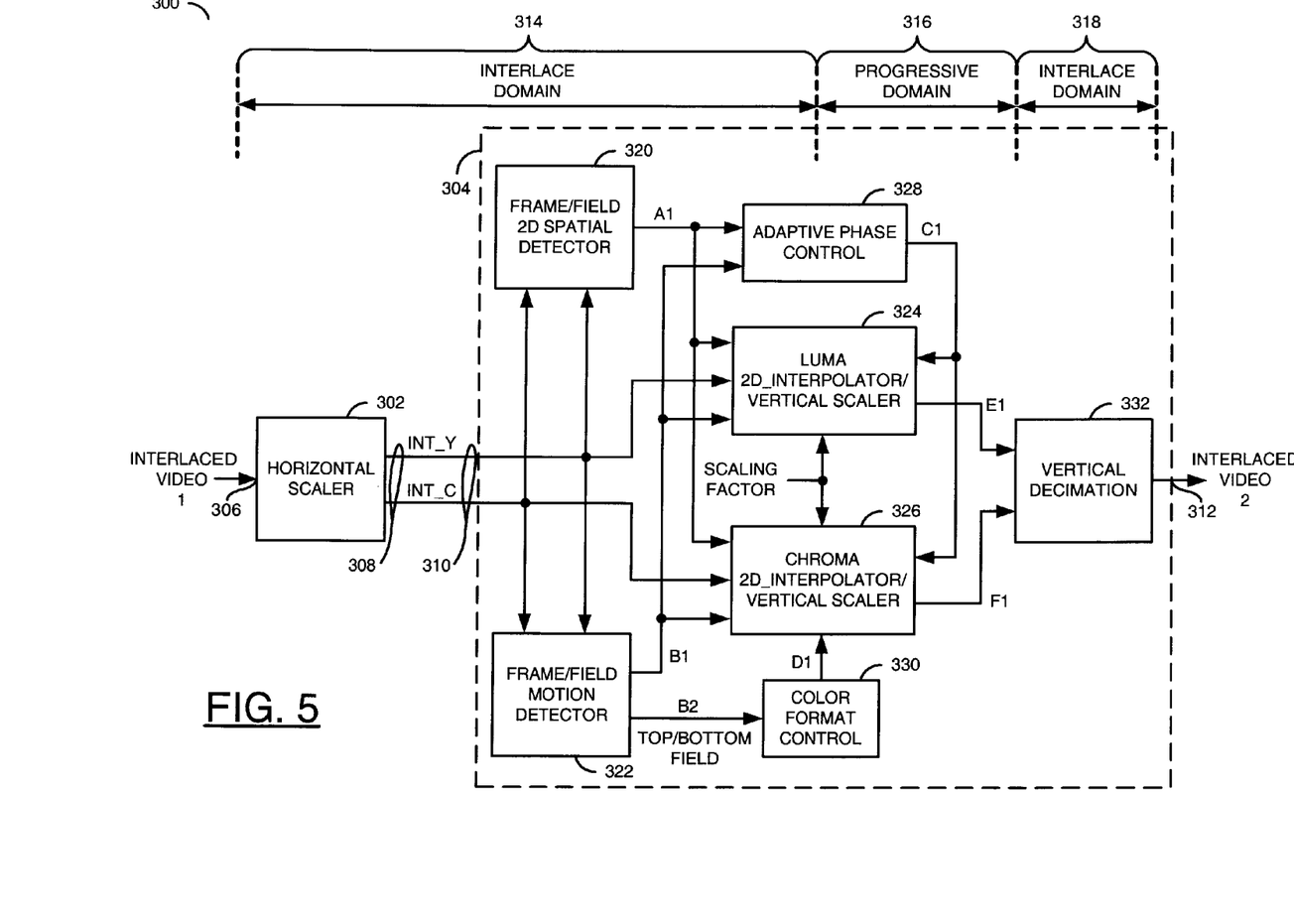
FIG. 5 is a block diagram illustrating an integrated interlaced video scaler in accordance with a preferred embodiment of the present invention.

Referring to FIG. 5, a more detailed block diagram of the system 300 is shown illustrating an integrated interlaced video scaler and color format converter in accordance with a preferred embodiment of the present invention. In one example, the system 300 may be configured to operate in a first interlace domain 314, a progressive domain 316 and a second interlace domain 318. The output 308 of the block 302 may be configured to output the signal INT as a luminance component (e.g., INT_Y) and a chrominance component (e.g., INT_C). The signal INT_Y may be a horizontally scaled luminance (Y) component of the signal INTERLACED_VIDEO_1. The signal INT_C may be a horizontally scaled chrominance (C or UV) component of the signal INTERLACED_VIDEO_1. The block 302 may be configured to generate the signals INT_Y and INT_C in response to the signal INTERLACED_VIDEO_1. The block 304 may be configured to generate the signal INTERLACED_VIDEO_2 in response to the intermediate signals INT_Y and INT_C received from the block 302.

In one example, the block 304 may comprise a block 320, a block 322, a block 324, a block 326, a block 328, a block 330 and a block 332. The block 320 may be implemented, in one example, as a frame/field 2D spatial detector. The block 322 may be implemented, in one example, as a frame/field motion detector. The block 324 may be implemented, in one example, as a luma 2D interpolator/vertical scaler. The block 326 may be implemented, in one example, as a chroma 2D interpolator/vertical scaler. The block 328 may be implemented, in one example, as an adaptive phase control block. The block 330 may be implemented, in one example, as a color format control block. The block 332 may be implemented, in one example, as a vertical decimation block. The blocks 320-332 may be implemented using hardware, software or a combination of hardware and software.

The signal INT_Y may be presented to a first input of the block 320, a first input of the block 322 and a first input of the block 324. The signal INT_C may be presented to a second input of the block 320, a second input of the block 322 and a first input of the block 326. The block 320 may have an output that may present a signal (e.g., A1) to a second input of the block 324, a second input of the block 326 and a first input of the block 328. The block 322 may have a first output that may present a signal (e.g., B1) to a third input of the block 324, a third input of the block 326 and a second input of the block 328. The block 322 may have a second output that may present a signal (e.g., B2) to an input of the block 330. In general, the blocks 302, 320 and 322 may operate in the first interlace domain 314.

The block 328 may have an output that may present a signal (e.g., C1) to a fourth input of the block 324 and a fourth input of the block 326. A signal (e.g., SCALING_FACTOR) may be presented to a fifth input of the block 324 and a fifth input of the block 326. The signal SCALING_FACTOR may be implemented as a control signal that may comprise one or more scaling factors. The block 330 may have an output that may present a signal (e.g., D1) to a sixth input of the block 326. The block 324 may have an output that may present a signal (e.g., E1) to a first input of the block 332. The block 326 may have an output that may present a signal (e.g., F1) to a second input of the block 332. The block 332 may have an output that may present the signal INTERLACED_VIDEO_2. The blocks 324-330 may operate simultaneously in both the first interlace domain 314 and the progressive domain 316. The block 332 generally operates in the second interlace domain 318.

The spatial detector 320 and the motion detector 322 may be used to adaptively change (or adjust) the behavior of the temporal and vertical resampling modules that also perform the interpolation of the missing lines prior to final resampling of each field. After the input signal INTERLACED_VIDEO_1 is scaled horizontally by the block 302, the two-dimensional spatial feature detector 320 may determine an amount of detail in a local area of each field and frame. In parallel, the motion detector 322 may determine an amount of motion between adjacent (e.g., future and past) fields. The blocks 320 and 322 may generate detection signals (e.g., the signals A1 and B1, respectively) that may be sent to the corresponding two-dimensional (e.g., vertical-temporal) interpolator/scaler blocks 324 and 326.

The block 324 and 326 may perform filtering and resampling operations. The filtering and resampling operations may be performed simultaneously. A phase of each of the filters may be controlled adaptively by the block 328. In one example, the block 328 may control the phase of the filters according to the spatial and temporal detection signals A1 and B1. The chroma module 326 may also receive instructions from the block 330. The block 330 may be configured to determine a phase offset for top and bottom fields for compliance with the various color format standards. Vertical decimation (or reinterlacing) may be performed by the block 332 in order to return to the interlaced domain 318.

In general, the present invention provides a method and apparatus that enables vertical scaling in an intermediate progressive domain thereby extending the original interlaced spectrum to reduce aliasing artifacts. The present invention may implement a motion and spatial adaptive interpolation process that may be used to perform (i) vertical-temporal scaling in the luma and chroma signals and (ii) color space conversion in the chroma signal. The present invention may provide a competitive advantage in improved quality for interlaced video coding. The present invention may be implemented with relatively low impact to the overall chip budget.

Within the practical implementation constraints of a system-on-chip (SOC), there may be limitations as to the accuracy of scalers/resampler modules in the vertical-temporal domain. The present invention generally provides a significant improvement in coding quality at lower bitrates. The fine distinction of extending the vertical-temporal domain by means of an intermediate progressive-to-interlaced conversion step, integrated in a single module with a conventional scaler and a chroma format converter not only may improve quality but may save resources. The present invention may be used in place of a traditional deinterlacer and/or scaler for progressive coding and display.

The present invention may be used to provide improvement of quality of all scaled (resampled) interlaced content, where resizing the original interlaced video sequence is desired, while keeping original quality of the interlaced video in the interlaced domain. The operation provided by the present invention is not limited to displays, but also may be applied to high quality resampled interlaced material used as input to encoders in general.

Figure 6:
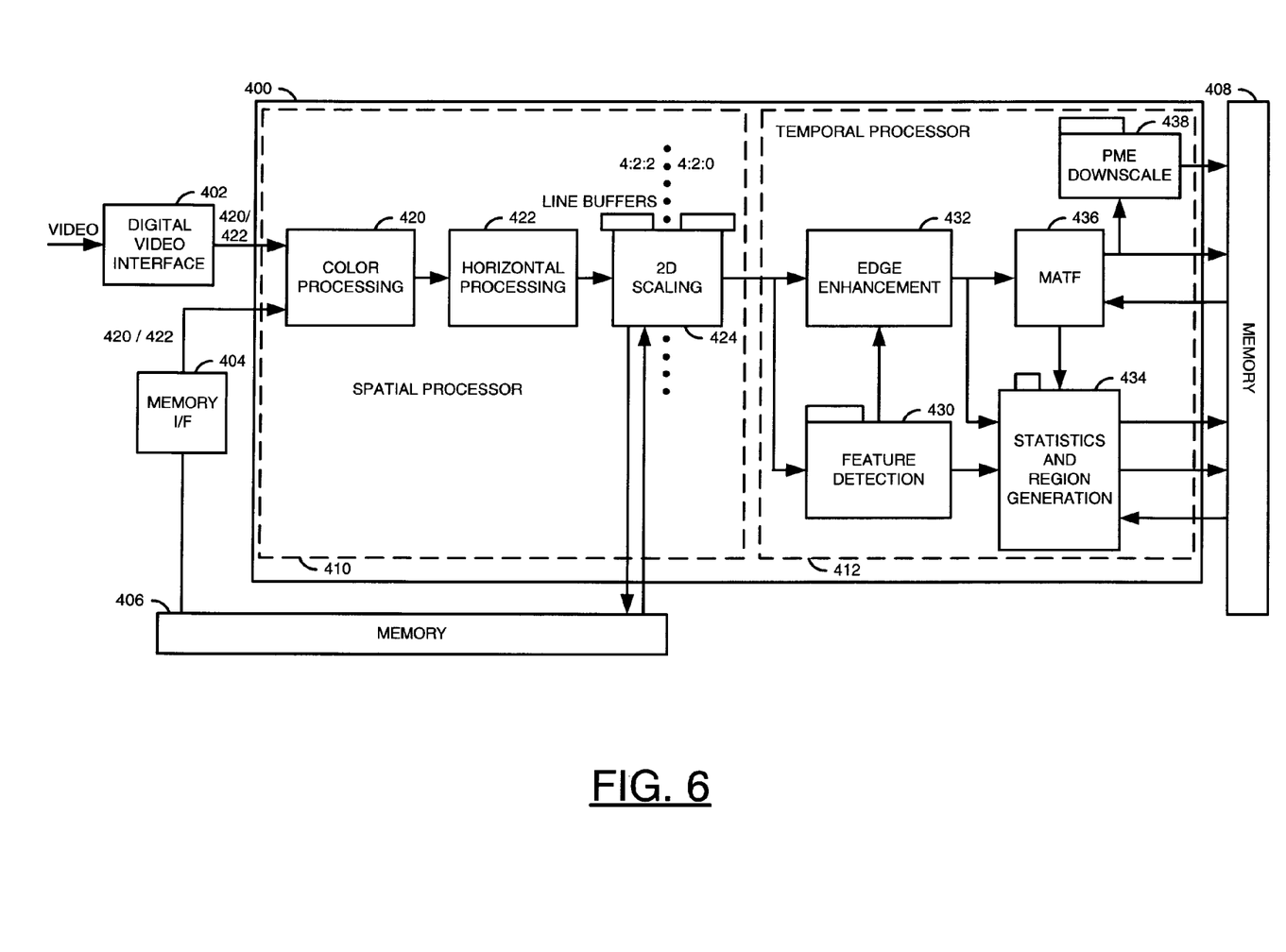
FIG. 6 is a block diagram illustrating a video preprocessor module implemented in accordance with the present invention.

Referring to FIG. 6, a block diagram is shown illustrating an example implementation of the present invention in the context of a video preprocessor (VPP) module 400. The module 400 may have a first input that may receive a signal (e.g., VIDEO) via an external digital video interface 402 and a second input that may receive image data via an external memory interface 404 from a memory 406. The module 400 may also have a number of inputs, outputs, or input/outputs that may be directly coupled to the memory 406 and a memory 408. The memories 406 and 408 may be implemented, for example, as part of the same physical memory device or as separate physical memory devices. In one example, the signal VIDEO may have a 4:2:0 format, while the image data received from the memory interface 404 may be in either 4:2:0 or 4:2:2 format. However, the block 402 may be configured to accept both 4:2:0 and 4:2:2 formatted signals.

The module 400 may comprises a block 410 and a block 412. The block 410 may be implemented, in one example, as a spatial processor (or processing module). The block 412 may be implemented, in one example, as a temporal processor (or processing module). The blocks 410 and 412 are generally coupled in the order the data is processed. The block diagram of FIG. 6 is generally provided as a top view illustration of signal flow rather than as a depiction of the details of a particular implementation. For example, although individual line buffers are indicated by small rectangles at the top of modules, it will be apparent that data may be managed through all the line buffers in a particular system.

The block 410 may be coupled to the digital video interface 402, the memory interface 404 and the memory 406. The block 410 may have an output that may present a signal to the block 412. The block 410 may be configured to provide color processing (e.g., brightness, contrast, gamma correction, hue and saturation), horizontal processing (e.g., noise reduction, scaling, etc.) and vertical processing (e.g., 2D scaling). The block 410 may be further configured to provide color format conversion from 4:2:2 to 4:2:0 format. The block 412 may be coupled to the memory 408. The block 412 may provide, but is not limited to providing, edge enhancement, two-dimensional statistics, image feature region generation and two-dimensional luma down scaling to assist motion estimation.

In one example, the block 410 may comprise a block 420, a block 422 and a block 424. The block 420 may be implemented as a color processing block. In one example, the block 420 may be configured to process brightness, contrast, gamma, hue and saturation of the input video signal. The block 422 may be implemented as a horizontal processing block. The block 424 may be implemented as a 2D scaling block. The block 420 may have a first input that may receive the signal VIDEO from the digital video interface 402, a second input that may receive the image data signal from the memory interface 404 and an output that may present a signal to an input of the block 422. The block 422 may have an output that may present a signal to an input of the block 424. The block 424 may have an input/output or separate input and output coupled to the memory 406 and an output that may present a signal to the input of the block 412. the block 424 may include a number of line buffers. The block 424 may be configured to provide color format conversion from a 4:2:2 format to a 4:2:0 format.

The block 412 may comprise a block 430, a block 432, a block 434, a block 436 and a block 438. The block 430 may be implemented as a feature detection block. The block 432 may be implemented as a edge detection block. The block 434 may be implemented as a statistics and region generation block. The block 436 may be implemented as a motion-adaptive temporal filter (MATF) block. The block 438 may be implemented as a downscale block. The signal from the block 410 may be presented to an input of the block 430 and a first input of the block 432. The block 430 may have a first output that may present a signal to a second input of the block 432 and a second output that may present a signal to a first input of the block 434. The block 432 may have an output that may present a signal to a second input of the block 434 and a first input of the block 436. The block 436 may have a first output that may present a signal to a third input of the block 434 and a second output that may present a signal to an input of the block 438 and the memory 408. The blocks 434, 436 and 438 may have a number of inputs, outputs, and/or input/outputs that may be coupled to the memory 408.

Figures 7, 7A:
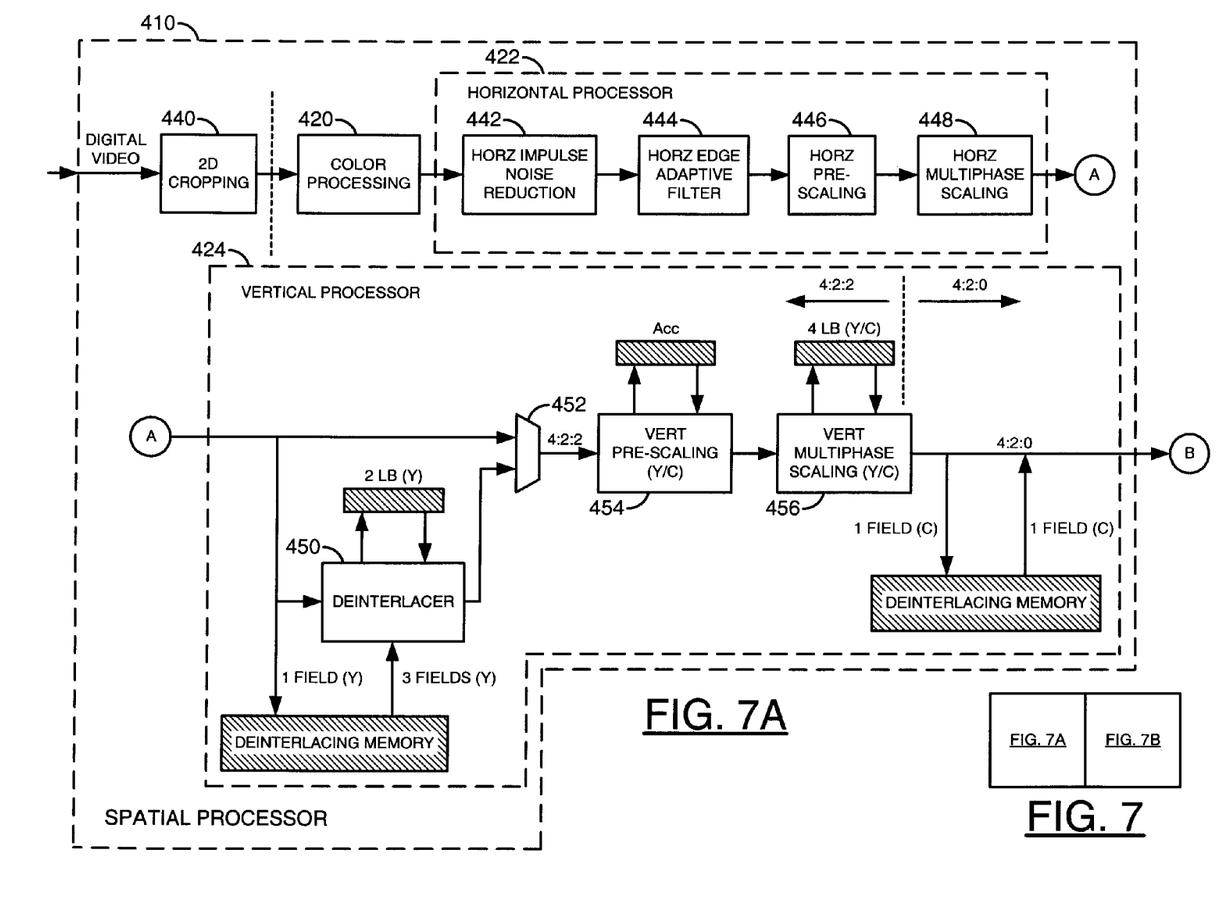
FIG. 7 is a more detailed block diagram illustrating an example implementation of the video preprocessor module of FIG. 6.
Figure 7B:
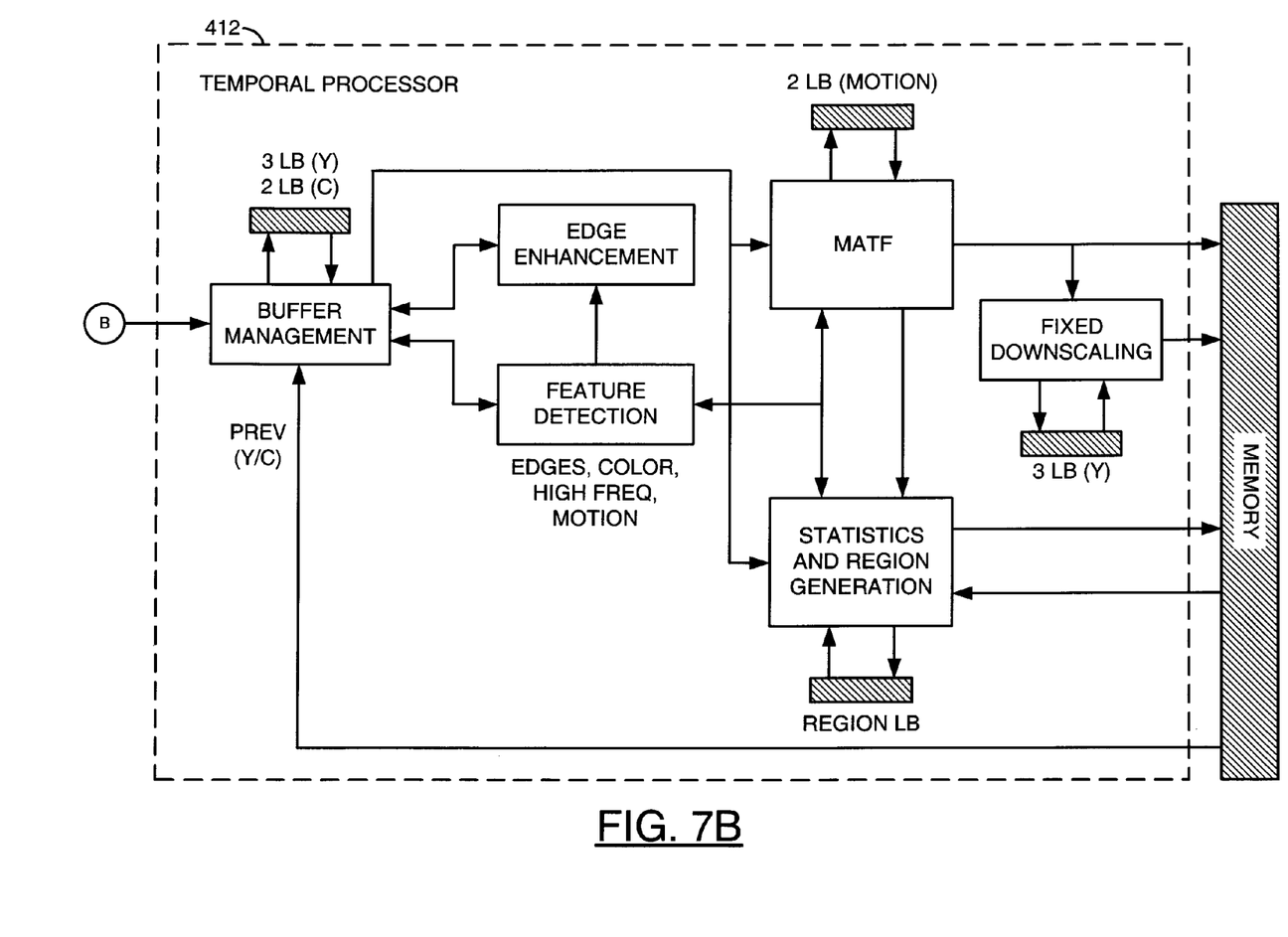

Referring to FIG. 7, a more detailed block diagram of the module 400 of FIG. 6 is shown. The processing blocks are presented from a signal processing flow point of view. Design level details are generally presented from a top level perspective to emphasize clarity instead of low level implementation details. The module 400 generally transforms the input video signal VIDEO or the image data received via the memory interface 404 into a sequence of pictures that may yield more efficiently compressed bitstreams. Processed frames are generally stored in memory, ready to be compressed by an encoding engine (not shown).

In one example, the block 410 may further include a 2D cropping block 440 that may be coupled between the inputs of the block 410 and the block 420. The block 440 may be configured to crop (reframe) and scale (resize) the input video. The amount of cropping and scaling may be programmable. In one example, the module 400 may be implemented with hardware control registers that may be updated at vertical sync times.

In one example, the block 422 may comprise a block 442, a block 444, a block 446 and a block 448. The block 442 may be implemented as a horizontal impulse noise reduction block. The block 444 may be implemented as a horizontal edge adaptive filter block. The block 446 may be implemented as a horizontal prescaling block. The block 448 may be implemented as a horizontal multiphase scaling block. In general, persons skilled in the art will understand how to implement the blocks 420 and 440-448 using conventional techniques and the information herein disclosed.

The block 442 may reduce random noise in the input video. Noise may be caused by random disturbances in the transmission channel (e.g., broadcast, cable, tape, etc), including drop-offs and sudden changes at the pixel and line levels. Most video system noise falls within two classes of noise that the module 442 is generally effective against. The first class of noise has a Gaussian PDF of zero mean. The first class of noise generally includes electronic and general transmission noise. The second class of noise is impulsive in nature. The second class of noise generally includes long run transmission errors, sometimes referred to as salt-and-pepper, speckle and line drop disturbances.

The module 400 may operate on data in raster scan format (e.g., one line at a time) as provided by the external video interface (e.g., the digital video interface 402, the memory interface 404, an external analog video digitizer, etc.). The module 400 may be used in a range of applications. Some example input video formats are outlined in the following Table 1:

TABLE 1

| FORMAT | FRAME SIZE | SCANNING | FRAME RATE |
|---|---|---|---|
| 1080i | 1920 × 1080 | Interlaced | 30 |
| 1080p | 1920 × 1080 | Progressive | 30 |
| 720p | 1280 × 720 | Progressive | 60 |
| 480p | 720 × 480 | Progressive | 30/60 |
| 576p | 720 × 576 | Progressive | 25/50 |
| 480i | 720 × 480 | Interlaced | 30 |
| 576i | 720 × 576 | Interlaced | 25 |

Formats using 24 frames/sec may also be implemented. The module 400 may process other picture sizes and frame rates, starting with 1080i and going all the way down to QCIF. In one example, a dual processing mode may be implemented by connecting two of the modules 400 in parallel. When operating in a dual processing mode (e.g., two parallel preprocessing paths implemented), the only limitations as to the nature of the formats processed are bandwidth and operating clock restrictions.

In one example, processed video data may be stored in separate luminance (Y) and chrominance (C or UV) frame buffers in an interlaced manner. For example, source video lines from the top field may be stored in even lines of the destination frame buffer, and source video lines from the bottom field may be stored in odd lines of the destination frame buffer. In some special cases (e.g., during 3:2 pulldown conversion from 30 fps to 24 fps) the top and bottom fields may proceed from different frames in time and therefore the memory organization may be configured for pairing across frames.

The cropped video may first be processed spatially horizontally (e.g., noise reduction and horizontal scaling) and then processed spatially in the vertical domain (e.g., vertical scaling). When the pictures are ready for compression, further processing may be performed, such as luma and/or chroma adjustments (e.g., by the color processor), edge enhancements and temporal noise reduction. In a preferred embodiment, the video may be cropped and then color processed. Statistics from luma and chroma, as well as regions based on features may be produced in parallel with temporal filtering. The statistics and region data may be used to improve compression efficiency by an advanced video coding standard (AVC) or other Codec.

As used herein, chroma samples are referred to as UV for simplicity. More precisely, the chroma components are color difference signals (B-Y) and (R-Y) that are sometimes also referred to as Cb and Cr. In general, all modules prior to chroma color space conversion (e.g., part of the vertical processing) are generally able to operate in both YUV 4:2:2 and YUV 4:2:0 domains.

In one example, the block 424 may be configured to scale up or down the vertical size of the input video by resampling the number of lines using a multiple-phase finite impulse response (FIR) filter structure. In order to improve scaling quality for large scaling ratios (e.g., when converting from 1080i to 480i or a smaller format such as QSIF), a deinterlacer structure may be implemented in conjunction with the vertical filter. The vertical scaler serves the double purpose of down sampling luma and chroma components independently and converting the chroma to 4:2:0 format.

The module 424 generally performs two functions. First, the module 424 resizes each field or frame in the vertical direction by resampling. Second, the module 424 performs YUV 4:2:2 to YUV 4:2:0 conversion by changing the vertical size of the chroma components with the proper phase offsets for field or frame YUV color format conversion.

In one example, the module 424 may comprise a block 450, a block 452, a block 454 and a block 456. The block 450 may be implemented as a deinterlacer module. The block 452 may be implemented as a multiplexer. The block 454 may be implemented as a vertical pre-scaling module. The block 456 may be implemented as a vertical multiphase scaling module. In one example, a portion of the memory 406 may be configured as a deinterlace memory coupled to the blocks 450 and 454. In order to better utilize hardware resources, the deinterlacer module 450 and the vertical scaler (e.g., modules 454 and 456) may share line buffers. As the input video is stored in line buffers for vertical scaling, the input video may also undergo conversion from interlace to progressive with decimation.

The chroma path may have a special processing mode to convert from the YUV 4:2:2 domain to the YUV 4:2:0 domain. Conversion from 4:2:2 to 4:2:0 entails a 2:1 vertical chroma size reduction with proper phase shifting to transform the co-located chroma components into fractional vertical offset components. For example, 4:2:2 to 4:2:0 conversion may involve a one-quarter or three-quarter offset in some standards, and a one-half, one-half offsets in other standards. The vertical offset (or interpolated-line locations) may be accomplished by programming and selecting the appropriate phase of the chroma vertical scaler. In one example, a control bit in a control register may be implemented to determine whether the data is processed as YUV 4:2:2 or YUV 4:2:0 through the modules leading up to the vertical scaler. For example, when the control bit is in a first state (e.g., a logic '1'), the vertical scaler 454 and 456 may be configured not to perform a format conversion. However, the vertical scaler for chroma may be still fully operational.

The module 424 is responsible for scaling the picture in the vertical direction. The deinterlacing module 450 is generally used mainly for interlaced conversions. The deinterlacer module 450 may be used for traditional interlace-to-progressive conversions. However, the quality at some extreme scaling ratios may not be as good as broadcast-quality deinterlacers. The deinterlacer module 450 may be used to improve the downscale quality when using large scaling factors. For example, the deiterlacer module 450 may be used when converting from a high definition interlaced format (e.g., 1080i, etc.) to a standard definition interlaced format (e.g., 480i).

The deinterlacer 450 is used in the interlace-to-interlace conversion because scaling single fields involves decimation that unavoidably produces aliasing components. The aliasing components may be ameliorated if an interlace-to-progressive conversion is performed before vertical scaling. The newly produced frame is then decimated into the proper even or odd lines of the destination field in order to achieve the field-based scaling.

Another advantage of using the deinterlacer 450 to improve the interlace-to-interlace conversion is that the deinterlacer 450 does not have to be very complex. Deinterlacers for performing interlace-to-progressive conversions on a wide variety of pictures need to be more complex to prevent artifacts in the conversion. The deinterlacer module 450 may be used in interlace-to-progressive conversions where the expectation of quality is not that of achieving broadcast-quality video.

The vertical pre-scaler block 454 generally performs a simple scaling operation to improve quality when using large scale down ratios. In one example, the operation comprises averaging N adjacent pixels and decimating by a factor N. For example, if the ratio is set to 4:1, a new pixel is produced for every four averaged vertically adjacent pixels in four lines. The lines are also adjacent in time, therefore, when operating in field mode, the lines belong to the same field.

Figure 8:
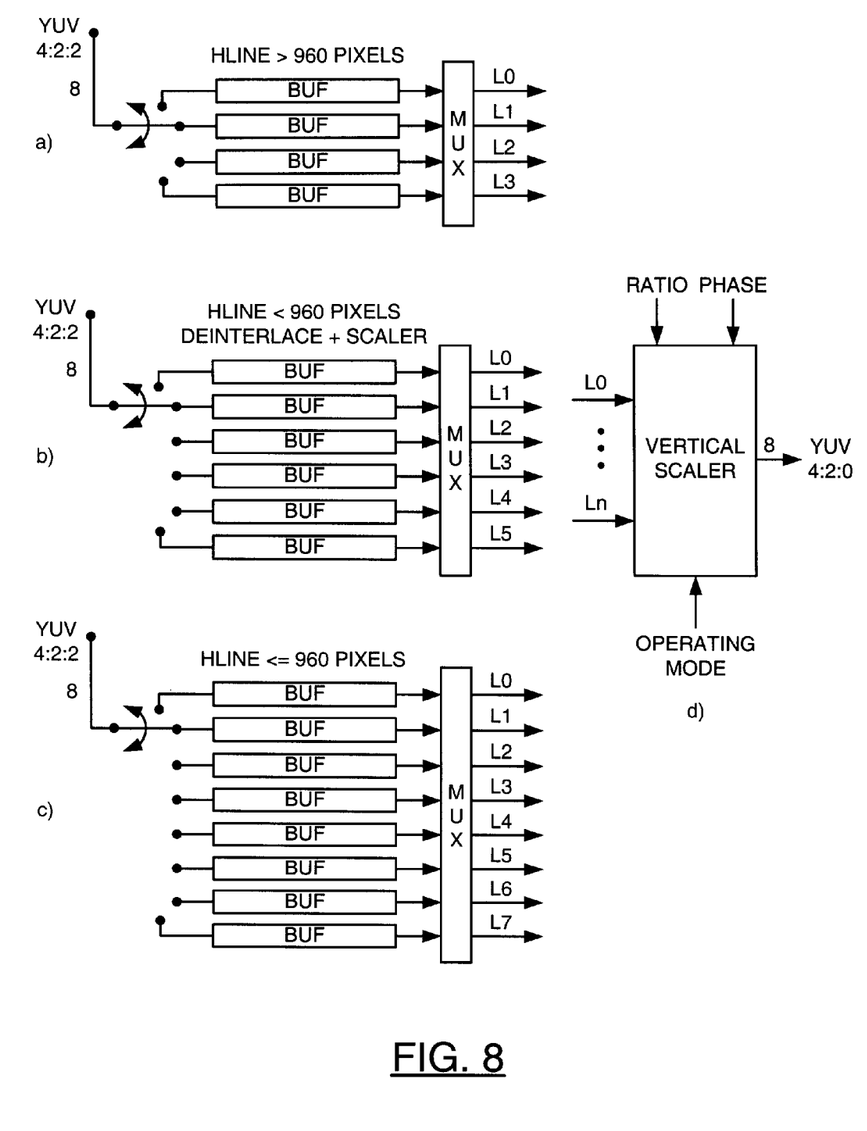

Referring to FIGS. 8(a-d), block diagrams are shown illustrating an example implementation of the vertical multiphase scaling block 456. The block 456 may comprise a number of vertical filter buffers (e.g., FIGS. 8(a-c) and a vertical scaler block (FIG. 8d). Depending on the size of the horizontal input lines, the vertical multiphase scaling block 456 may comprise vertical filter buffers arranged to realize a 4-tap (e.g., FIG. 8a), 6-tap (e.g., FIG. 8b) or 8-tap (e.g., FIG. 8c) filter. The vertical multiphase scaling block 456 may be programmed to set the unused taps to zero depending on the operating mode. In one example, for horizontal line widths greater than 960 pixels (e.g., 1080i, etc.) the number of taps implemented may be four. The small number of taps may make the value of using the deinterlacing more justifiable. For example, the small number of taps may conserve line buffer memory. In one example, line buffer memory may be further conserved by internally implementing the line buffers 960 pixels wide.

In one example, the scaler may be configured to be bypassed by writing zeros to all coefficients, except the center tap and by setting an autoincrement and phase control bits to zero. However, chroma coefficients should have valid values when the color format conversion is active. Therefore, while it may be desirable to bypass the luma vertical scaler in most situations, it is not recommended for the chroma scaler when converting chroma formats.

Since the filter coefficients are symmetrical, phases 0-4 may be loaded, while phases 5-7 may be generated from phases 3-1. The divisor used for the coefficients may be set to 512. Each set of coefficients may be viewed as a matrix of values where the rows represent the 8 phases and the columns represent the vertical taps (4, 6, or 8). In one example, the filter may be defined using pseudo code, as illustrated by the following example. #define TAPS 8
// Up to eight taps are allowed, with restrictions depending on line buffer size
define PHASES 8
int I, j;
int filter[PHASES][TAPS];
// copy phases 3 to 1 to phases 5 to 7, reversing taps in the process
for (I=5; I<PHASES; i++){for (j=0; j<TAPS; j++){filter[i][j]=filter[PHASES-i][TAPS-j-1];}

Figure 9:
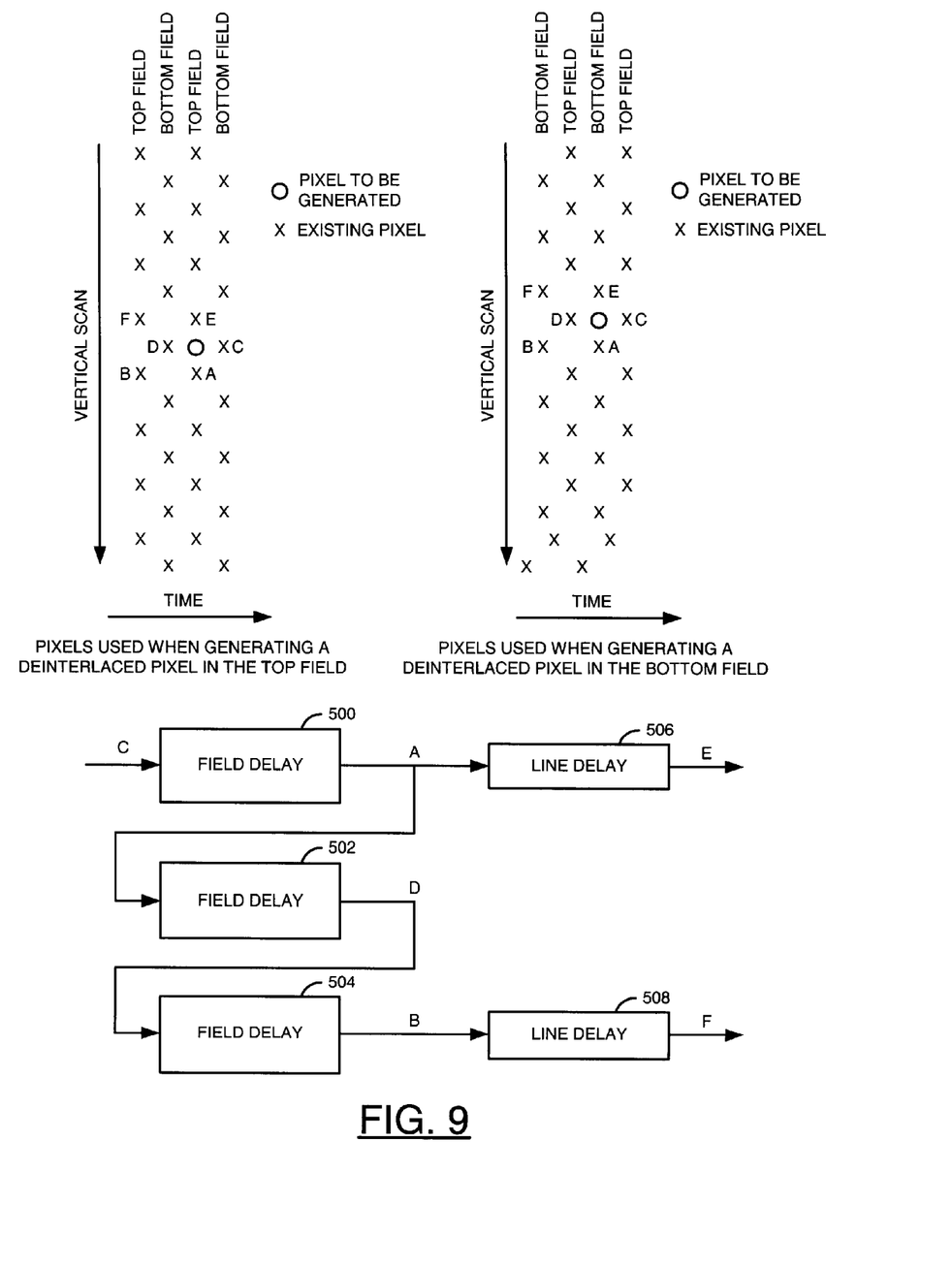
FIG. 9 is a block diagram illustrating deinterlace field delays.

Referring to FIG. 9, a block diagram is shown illustrating an example implementation of deinterlace field delays in the deinterlacer 450. In one example, a deinterlaced pixel may be generated using neighboring pixels in four fields (e.g., pixels A-F). Pixel A may be related to pixel C by a field delay 500. Pixel D may be related to pixel A by a field delay 502. Pixel B may be related to pixel D by a field delay 504. Pixel E may be related to pixel A by a line delay 506. Pixel F may be related to pixel B by a line delay 508.

Figure 10:
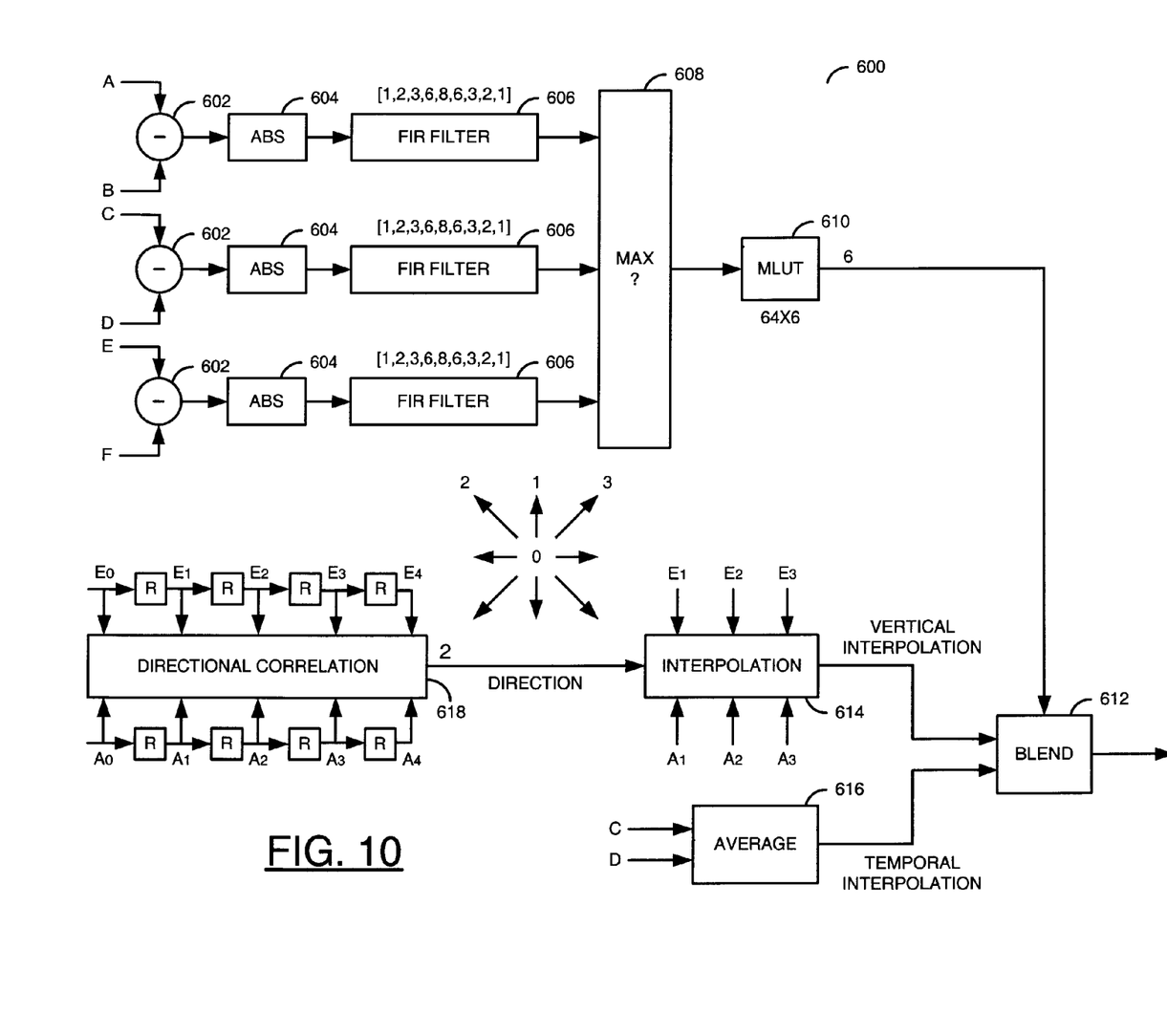
FIG. 10 is a block diagram illustrating an example of a deinterlace data path in accordance with a preferred embodiment of the present invention.

Referring to FIG. 10, a block diagram is shown illustrating a deinterlace data path 600 in accordance with the present invention. The pixels in the spatial/temporal locations A-F (as indicated in FIG. 9) may be compared using a number of differentiators 602, absolute value blocks 604 and finite impulse response (FIR) filtering blocks 606 to produce a smoothed signal at the input of the MAX comparator 608. In one example, pixel A may be compared to pixel B, pixel C may be compared to pixel D, and pixel E may be compared to pixel F. The output of comparator 608 is generally the maximum value of the three inputs that constitute temporal differences. The temporal differences may be converted to motion using a non-linear transfer function. In one example, the non-linear transfer function may be implemented in a motion look-up table (MLUT) 610. For example, the MLUT 610 may implement a gaussian or laplacian transfer function.

An output of the MLUT 610 (e.g., a motion signal) may be used to control a blending block 612. The block 612 may be configured to blend between vertically interpolated pixels (e.g., see labels A and E in FIG. 9), and temporally interpolated average values C and D (e.g., see FIG. 9 for location of C and D). The vertical interpolation of the pixels A and E may be performed by an interpolation block 614. The temporal interpolation of the values C and D may be performed by an averaging block 616.

The interpolation block 614 may receive a vertical interpolation direction signal (e.g., DIRECTION) from a directional correlation block 618. The directions that may be signaled by the directional correlation block 618 are generally indicated above the signal DIRECTION. When the direction value is '0', all A and E values are averaged. When the direction value is '1', only the A2 and E2 values are averaged. When the direction value is '2', only the A3 and E1 values are averaged. When the direction value is '3', only the A1 and E3 values are averaged. In this context 'average' means 'vertical interpolation'. The blocks 602-618 may be implemented with conventional techniques. In general, there is no preclusion as to the complexity used in each of the blocks 602-618. In general, a very complex directional correlation block 618 will generally improve the performance of a generic deinterlacer. However, a simple directional correlation block 618 may be implemented generally.

MPEG compression assumes input video is formatted in the YUV 4:2:0 domain. Most digital video, for instance ITU-R-656, is formatted in the YUV 4:2:2 domain. Therefore, color format conversion is needed for compression. The color format conversion operation is typically performed by a dedicated circuit. However, the present invention takes advantage of the chroma vertical scaler with some provisions for proper phase (vertical offset) processing.

Essentially, color format conversion involves a vertical down sampling of the chroma components by a factor of two. The first step is to properly Nyquist filter in the vertical domain, along with the appropriate fractional vertical offset. The next step is to decimate the chroma lines so that every other line of chroma is dropped. The vertical offset may be accomplished by appropriately programming and selecting the phase of the vertical multiple-phase filter so that the chroma lines of the top field are closer to the top, and the chroma lines of the bottom field are closer to the bottom. A more complete discussion of 4:2:2 to 4:2:0 conversion may be found in the ISO-14496-10 Standard document, which is hereby incorporated by reference in its entirety.

The module 410 automatically controls the color space conversion after reading external signals from the digital video interface 402 or from the memory interface (or controller) 404. When data comes from the block 402, the data may be in either YUV 4:2:2 format or YUV 4:2:0 format. When the data is in the YUV 4:2:2 format, color conversion is applied. When data comes from memory via the memory interface module 404, the conversion is performed according to the programming of the module.

The vertical scaling operation performed by the block 424 generally involves the resampling of the input fields (or frames) in the vertical direction by using, for example, a good quality scaling multiple-phase filter. Resampling generally involves Nyquist filtering and decimation because the main purpose of the filter is to downscale the input video.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to generate a first control signal, a second control signal and a third control signal in an interlace domain in response to spatial and motion contents of a first interlaced video signal; and
   a second circuit configured to generate a second interlaced video signal in the interlace domain according to said first interlaced video signal, said first, second and third control signals, wherein said first, second and third control signals are used in an adaptive phase control and a color format control within said second circuit to further control interpolation and vertical scaling of said first interlaced video signal in an extended vertical domain, and this vertical scaling is associated with operation in an intermediate progressive domain to extend interlace spectrum and reduce aliasing artifacts.

2. The apparatus according to claim 1, wherein said first and said second circuit comprise an integrated vertical-temporal adaptive scaler and color format converter.

3. The apparatus according to claim 1, further comprising a horizontal scaler configured to generated said first interlaced video signal in response to an interlaced video input signal.

4. The apparatus according to claim 1, wherein said first circuit comprises:
   a frame/field 2D spatial detector configured to generate said first control signal in response to said first interlaced video signal; and
   a frame/field motion detector configured to generate said second control signal and said third control signal in response to said first interlaced video signal.

5. The apparatus according to claim 4, wherein said second circuit comprises:
   an adaptive phase control configured to generate a fourth control signal in response to said first control signal and said second control signal;
   a color format control configured to generate a fifth control signal in response to said third control signal;
   a first 2D interpolator/vertical scaler configured to generate a first intermediate signal in response to said first control signal, said second control signal, said fourth control signal, said first interlaced video signal and a scaling factor;
   a second 2D interpolator/vertical scaler configured to generate a second intermediate signal in response to said first control signal, said second control signal, said fourth control signal, said fifth control signal, said first interlaced video signal and said scaling factor; and
   a vertical decimator configured to generate said second interlaced video signal in response to said first intermediate signal and said second intermediate signal.

6. The apparatus according to claim 5, wherein:
   said first 2D interpolator/vertical scaler is configured to process luminance information; and
   said second 2D interpolator/vertical scaler is configured to process chrominance information.

7. The apparatus according to claim 6, wherein said second 2D interpolator/vertical scaler is further configured to perform color format conversion.

8. The apparatus according to claim 7, wherein said color format control is configured to determine a phase offset for top and bottom fields for compliance with the various color format standards.

9. The apparatus according to claim 5, wherein said adaptive phase control is configured to control a phase of the first 2D interpolator/vertical scaler and a phase of the second 2D interpolator/vertical scaler according to a spatial detection signal generated by a frame/field 2D spatial detector and a temporal detection signal generated by a frame/field motion detector.

10. The apparatus according to claim 5, wherein:
said frame/field 2D spatial detector and said frame/field motion detector operate in a first interlace domain;
said adaptive phase control, said first 2D interpolator/vertical scaler, said second 2D interpolator/vertical scaler and said color format control operate in said first interlaced domain and a progressive domain; and
said vertical decimator operates in a second interlace domain.

11. The apparatus according to claim 1, wherein said first circuit and said second circuit are used to perform an interlaced-to-progressive conversion.

12. A method of interlaced video resampling and color format conversion comprising the steps of:
generating a first control signal, a second control signal and a third control signal in an interlace domain in response to spatial and motion contents of a first interlaced video signal; and
generating a second interlaced video signal in the interlace domain according to said first interlaced video signal, said first, and third control signals, wherein said first, second and third control signals are used in an adaptive phase control and a color format control to further control interpolation and vertical scaling of said first interlaced video signal in an extended vertical domain, and this vertical scaling is associated with operation in an intermediate progressive domain to extend interlace spectrum and reduce aliasing artifacts.

13. The method according to claim 12, wherein said first control signal comprises a spatial detection signal, said second control signal comprises a temporal detection signal and said third control signal comprises a top/bottom field signal.

14. The method according to claim 13, wherein generating the second interlaced video signal further comprises:
generating a phase control signal in response to said spatial detection signal and said temporal detection signal; and
generating a color format control signal in response to said top/bottom field signal.

15. The method according to claim 14, wherein generating the second interlaced video signal further comprises:
generating a first intermediate signal by performing 2D interpolation and vertical scaling on a luminance component of said first interlaced video signal using said phase control signal, said spatial detection signal, said temporal detection signal and a scaling factor signal.

16. The method according to claim 15, wherein generating the second interlaced video signal further comprises:
generating a second intermediate signal by performing 2D interpolation and vertical scaling on a chrominance component of said first interlaced video signal using said phase control signal, said spatial detection signal, said temporal detection signal, said color format control signal and said scaling factor signal.

17. The method according to claim 16, wherein generating the second interlaced video signal further comprises vertically decimating the first intermediate signal and the second intermediate signal.

18. The method according to claim 17, wherein:
said first interlaced video signal, said spatial detection signal, said temporal detection signal, and said top/bottom field signal are generated in a first interlace domain; and
said first intermediate signal and said second intermediate signal are generated in a progressive domain and vertically decimated in a second interlace domain.

19. The method according to claim 12, further comprising the step of generating said first interlaced video signal by horizontally scaling an interlaced video input signal.

20. An apparatus comprising:
means for generating an intermediate signal by horizontally scaling a first interlaced video signal in an interlace domain; and
means for generating a second interlaced video signal in the interlace domain in response to said intermediate signal, wherein said second interlaced video signal generating means is further configured to interpolate and vertically scale said intermediate signal in an extended vertical domain, and this vertical scaling is associated with operation in an intermediate progressive domain based on an adaptive phase control and a color format control that are determined in the interlace domain by spatial and motion contents of the intermediate signal.

* * * * *